United States Patent
Vähä-Sipilä

(10) Patent No.: US 7,287,161 B2
(45) Date of Patent: Oct. 23, 2007

(54) METHOD AND SYSTEM FOR TESTING A PROGRAM, AND A DEVICE

(75) Inventor: Antti Vähä-Sipilä, Helsinki (FI)

(73) Assignee: Nokia Corporation, Espoo (FI)

( * ) Notice: Subject to any disclaimer, the term of this patent is extended or adjusted under 35 U.S.C. 154(b) by 866 days.

(21) Appl. No.: 10/746,760

(22) Filed: Dec. 26, 2003

(65) Prior Publication Data
US 2004/0205349 A1 Oct. 14, 2004

(30) Foreign Application Priority Data
Dec. 27, 2002 (FI) ................................. 20022278

(51) Int. Cl.
*G06F 9/00* (2006.01)
(52) U.S. Cl. ...................... 713/170; 713/182; 713/161; 713/168
(58) Field of Classification Search ................ 713/182, 713/161, 168, 170
See application file for complete search history.

(56) References Cited

U.S. PATENT DOCUMENTS

| | | | |
|---|---|---|---|
| 5,261,002 A | 11/1993 | Perlman et al. | |
| 5,892,900 A | 4/1999 | Ginter et al. | |
| 6,223,291 B1 | 4/2001 | Puhl et al. | |
| 6,393,563 B1 | 5/2002 | Maruyama et al. | |
| 2002/0013772 A1 | 1/2002 | Peinado | |
| 2002/0184515 A1 | 12/2002 | Oho et al. | |
| 2003/0163685 A1 | 8/2003 | Paatero | |

FOREIGN PATENT DOCUMENTS

| | | |
|---|---|---|
| EP | 0813132 | 12/1997 |
| EP | 1 033 652 | 9/2000 |
| EP | 1 217 850 | 6/2002 |
| EP | 1 338 938 | 8/2003 |

*Primary Examiner*—Thomas R. Peeso
(74) *Attorney, Agent, or Firm*—Alfred A. Fressola; Ware, Fressola, Van Der Sluys & Adolphson LLP

(57) ABSTRACT

The present invention relates to a method and system for testing programs. In the method, authorization to use is determined for a program. In the method, a grant message of authorization is produced to grant temporally restricted authorization to use for the program, it is verified that the grant message of authorization is suitable to be utilized only in the device and the verified grant message of authorization is transmitted to the device. In the device the verification is checked, the authorization to use transmitted in the grant message of authorization is determined, and authorization to use according to the grant message of authorization are given for the program to be tested, if the checking shows that the grant message of authorization is intended for the device. The invention also relates to a device in which the method is applied.

19 Claims, 3 Drawing Sheets

METHOD AND SYSTEM FOR TESTING A PROGRAM, AND A DEVICE

CROSS-REFERENCE TO RELATED APPLICATIONS

This application claims priority under 35 USC §119 to Finnish Patent Application No. 20022278 filed on Dec. 27, 2002.

FIELD OF THE INVENTION

The present invention relates to a method for testing a program in a device in which authorization to use is determined for a program. The invention also relates to a system in which authorization to use is determined for a program. Furthermore, the invention relates to a system in which authorization to use is determined for a program.

BACKGROUND OF THE INVENTION

As electronic devices are becoming more versatile, a need has arisen to protect certain functions of the electronic devices in such a manner that access to the functions can be attained only through authorized programs. For example mobile phones have been developed into communication devices suitable for versatile data processing, in which it is also possible to execute programs other than those necessary for implementing phone calls. It is also possible to install new programs in such devices and already installed programs can be updated into newer versions. However, for example mobile phone functions require a certain securing that any given program is not capable of for example determining information stored in the SIM card or making phone calls to the mobile communication network with inaccurate identification data so that another mobile subscriber is charged for the calls. In a corresponding manner devices containing for example functions relating to monetary transactions, such as using the device as a means of payment, it must be ensured than an erroneous or inappropriate program is not allowed to affect the monetary transactions or to change for example the data on the amount of money stored in the device. For the situations of the above kind the software of the device is provided with a protected part in which the necessary trust checkings and functions relating to encoding and decoding are performed. Furthermore, such devices typically contain an operating system that is used e.g. for controlling the functional blocks of the device and for transmission of data between different blocks. Between the operating system and the protected part an interface is implemented, and information is transmitted via said interface between the operating system and the protected part. For example an encrypted message received in the device is transmitted to the protected part, in which decryption is performed, whereafter the decrypted message can be transmitted to the operating system for further processing.

The programs executed in the device can be divided into various levels of authorization to use. The programs can be divided for example into such programs that do not have any authorization to use functions requiring trust, and into such programs that have the possibility to process at least some of the functions requiring trust. Thus, when the program is started the operating system or protected part checks the authorization to use of the programs and prevents or allows the access of the program to certain functions. The act of determining the authorization to use may be based for example to the origin of the program, wherein it is possible to provide for example a program produced by the manufacturer of the device with wider authorization to use than a program produced by a third party. On the other hand, for example the manufacturer of the device can provide a particular program vendor with wider authorizations (greater trust) than others, wherein it is possible to provide programs of more trustworthy program vendors with wider authorization to use than programs having a lower or undetermined vendor trust level.

One problem in the devices of the above kind is that when new programs are developed or already existing programs are developed further, it should be possible to test the programs in an environment as authentic as possible. If such a program is given the authorization to use functions requiring trust, there is a danger that the program to be developed is not safe, but it contains an error that has a harmful effect on the aforementioned functions which require trust. Denying of authorization to use on the other hand prevents an extensive testing of such a program in an authentic device. The use of a test device in the testing does not necessarily reveal all the flaws and defects of the program, wherein the final program version may still be defective or flawed, in spite of the testing.

In some solutions of prior art the trust level of the entire device has been lowered for the duration of the testing. Thus there is a risk that the tester or a third party manages to start such a program in the device that obtains confidential information relating to the security functions of the device or utilizes the device in a data network to obtain secret or confidential information.

SUMMARY OF THE INVENTION

It is an aim of the present invention to provide an improved method and system for testing of programs under development in an authentic equipment environment. The invention is based on the idea that a digitally signed and/or encrypted message is transmitted to a device preferably at least partly by means of wireless data transmission, wherein the digital signature is verified and/or the encrypted message is decrypted in the device and a temporally restricted authorization to use the functions of the device is granted for the program to be tested. The aim of this signature and/or encryption is to ensure that the grant message of authorization is suitable to be utilized only in the device for which it is intended. More precisely, the method according to the present invention is primarily characterized in that a grant message of authorization is produced to grant temporally restricted authorization to use for a program, it is verified that the grant message of authorization is suitable for use only in said device, the verified grant message of authorization is transmitted to the device in which the verification is checked, the authorization to use transmitted in the grant message of authorization is determined, and authorization to use according to the grant message of authorization is given for the program to be tested, if the checking indicates that the grant message of authorization is intended for said device. The system according to the invention is primarily characterized in that the system contains a server for producing a grant message of authorization to grant temporally restricted authorization to use for a program, a verifier for verifying that the grant message of authorization is suitable for use in said device, a communication network for transmitting the verified grant message of authorization to the device containing a checker for checking the verification of the grant message of authorization, determination means for determining the authorization to use transmitted in the grant message of authorization, and a program installation service for giving the authorization to use according to the grant message of authorization for the program to be tested, if the checking indicates that the grant message of authorization is intended for said device. Furthermore, the device according to the invention is primarily characterized in that the device comprises a receiver to receive a verified grant message of authorization produced for the program to be tested to grant temporally restricted authorization to use for the program, a checker of the verification to check the verification of the grant message of authorization, determination means for determining the authorization to use transmitted in the grant message of authorization, and a program installation service for giving the authorization to use according to the grant message of authorization for the program to be tested, if the checking indicates that the grant message of authorization is intended for said device.

The present invention shows remarkable advantages over solutions of prior art. In the system according to the invention it is possible to test the programs in surroundings and environments that comply with the actual use situation as well as possible. Thus the likelihood of detecting errors is greater than in solutions of the prior art, wherein finished programs are also more reliable. Furthermore, a separate testing device is not necessary for performing the testing, which also reduces the testing costs.

Furthermore, when the solution according to the invention is applied, only a determined device can utilize the granted authorization to use. Thus, the device manufacturer is aware of the fact that only a predetermined device has the possibility to utilize the grant message of authorization.

BRIEF DESCRIPTION OF THE DRAWINGS

In the following, the invention will be described in more detail with reference to the appended drawings, in which.

DETAILED DESCRIPTION OF THE INVENTION

Figure 1:
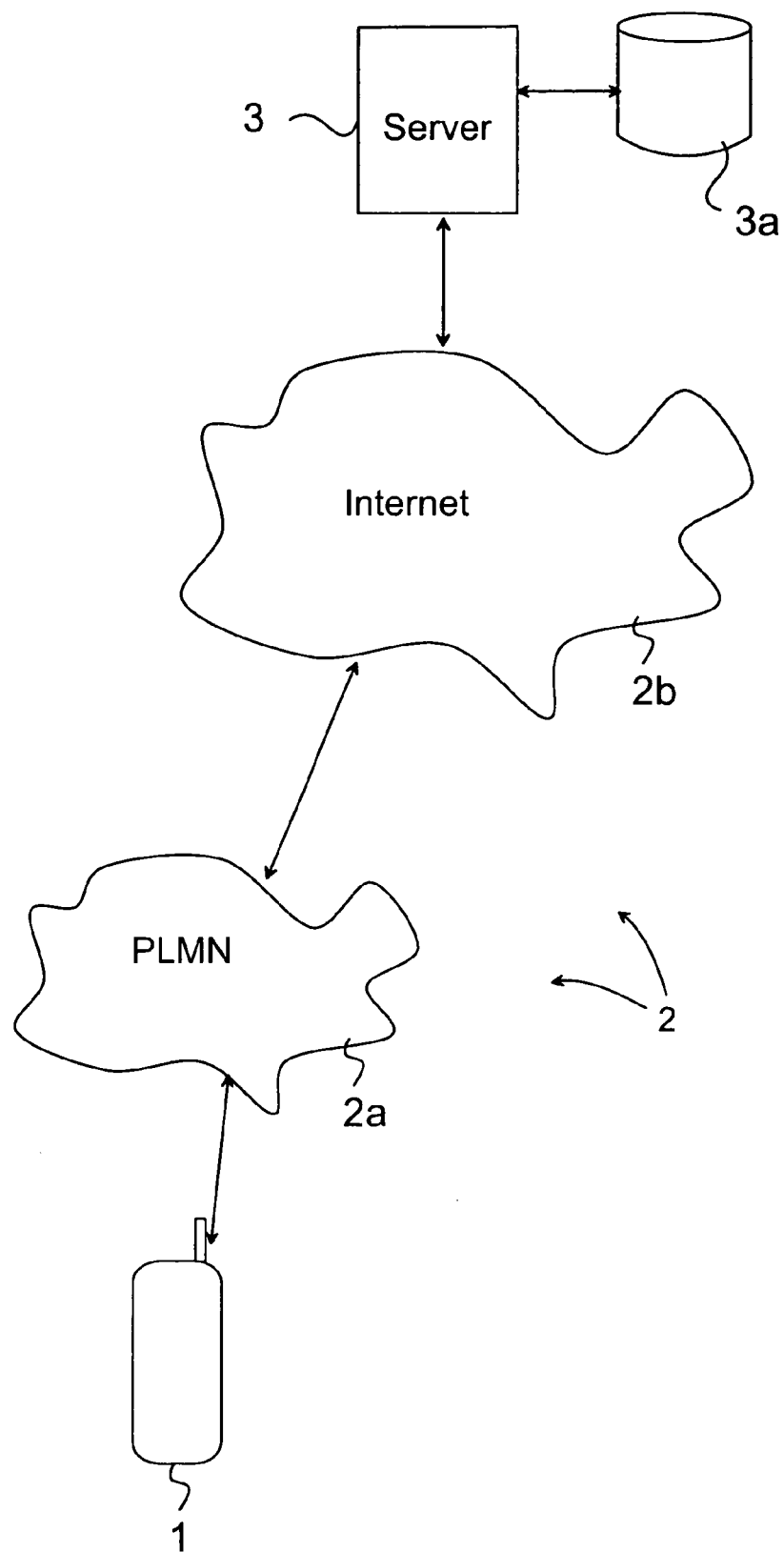
FIG. 1 shows a system according to a preferred embodiment of the invention in a reduced chart.

The operation of the method according to a preferred embodiment of the invention is described in the following, using as an example the system of FIG. 1 that comprises a device 1 in which programs are tested. The system also comprises a communication network 2, comprising advantageously at least a wireless communication network 2a, such as a mobile communication network. Furthermore, the system comprises a server 3 of the device manufacturer that is arranged to communicate via the communication network, for example through the Internet data network 2b.

Figure 2:
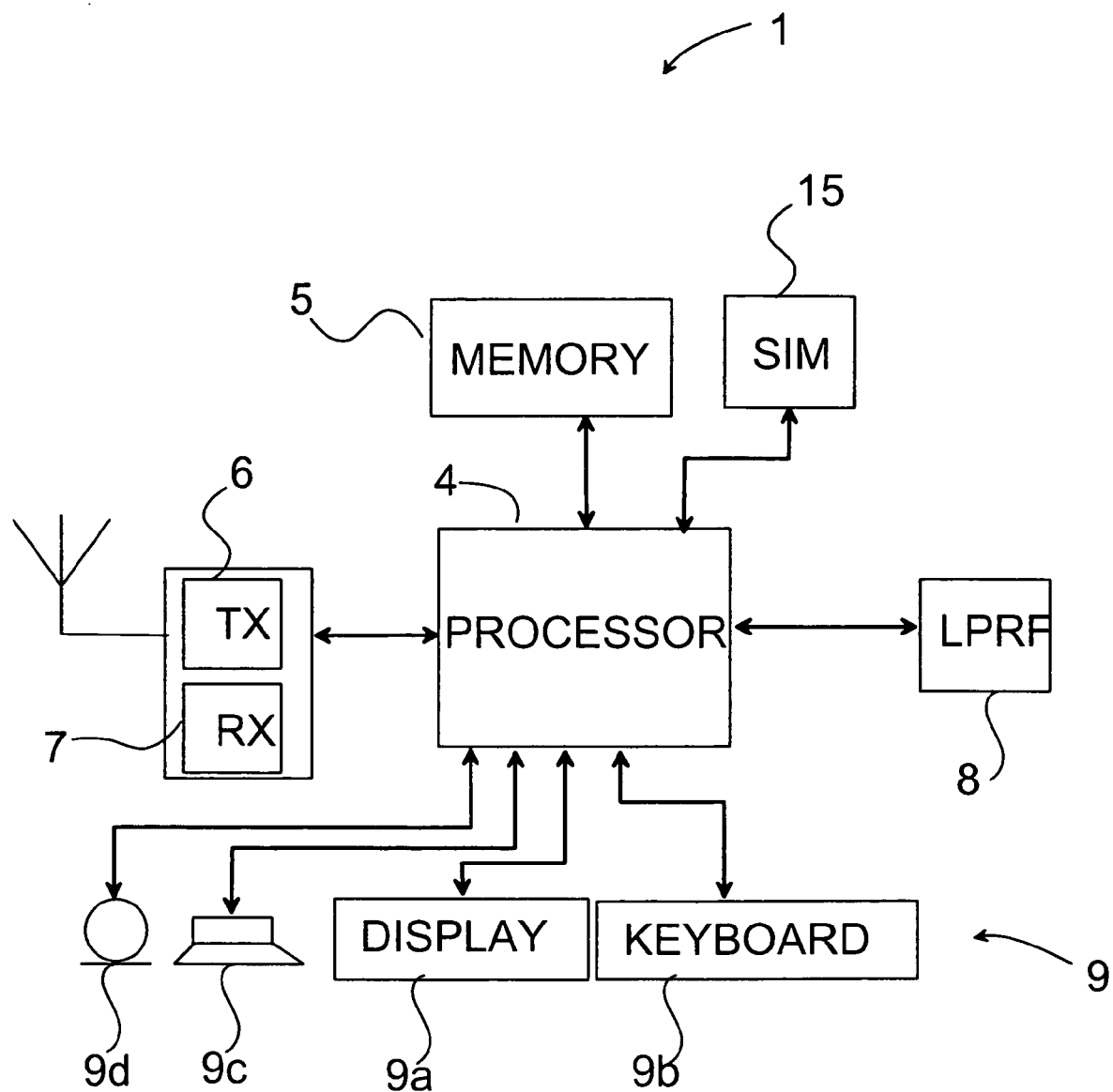
FIG. 2 shows a device according to a preferred embodiment of the invention in a reduced block chart.

FIG. 2 shows in more detail the structure of the device 1 according to a preferred embodiment of the invention. The device 1 comprises one or several processors 4 for executing programs, performing operating system functions of the device, controlling the operation of different functional blocks of the device, etc. The device also comprises a memory 5 for instance for storing programs and information necessary in the operation of the programs and the device. The device 1 also comprises a transmitter 6 and a receiver 7 by means of which the device 1 can communicate with the communication network 2. The transmitter 6 and the receiver 7 are preferably intended for wireless communication, wherein it is possible to communicate with a wireless communication network 2a by means of the device 1. The device 1 can also contain for example local communication means 8 for communicating with other devices (not shown) in the vicinity of the device 1. These local communication means 8 consist for example of a transmitter/receiver based on low-power radio transmission, such as a Bluetooth™ transmitter/receiver.

The operating system 9 of the device advantageously comprises a display 9a, a keyboard 9b, an earpiece/speaker 9c and a microphone 9d. It is obvious that the device can also comprise more than one user interface. Thus, one user interface may be arranged primarily for data processing functions, and the other user interface may be arranged primarily for mobile phone functions. One example of such a device is the Nokia 9210i Communicator™. The device 1 also advantageously contains an identification card 15 of the user, such as SIM (Subscriber Identification Module) and/or USIM (UMTS Subscriber Identification Module), by means of which the user is identified when the device 1 is switched on, and the properties of the mobile station functions granted for the user are determined.

Figure 3:
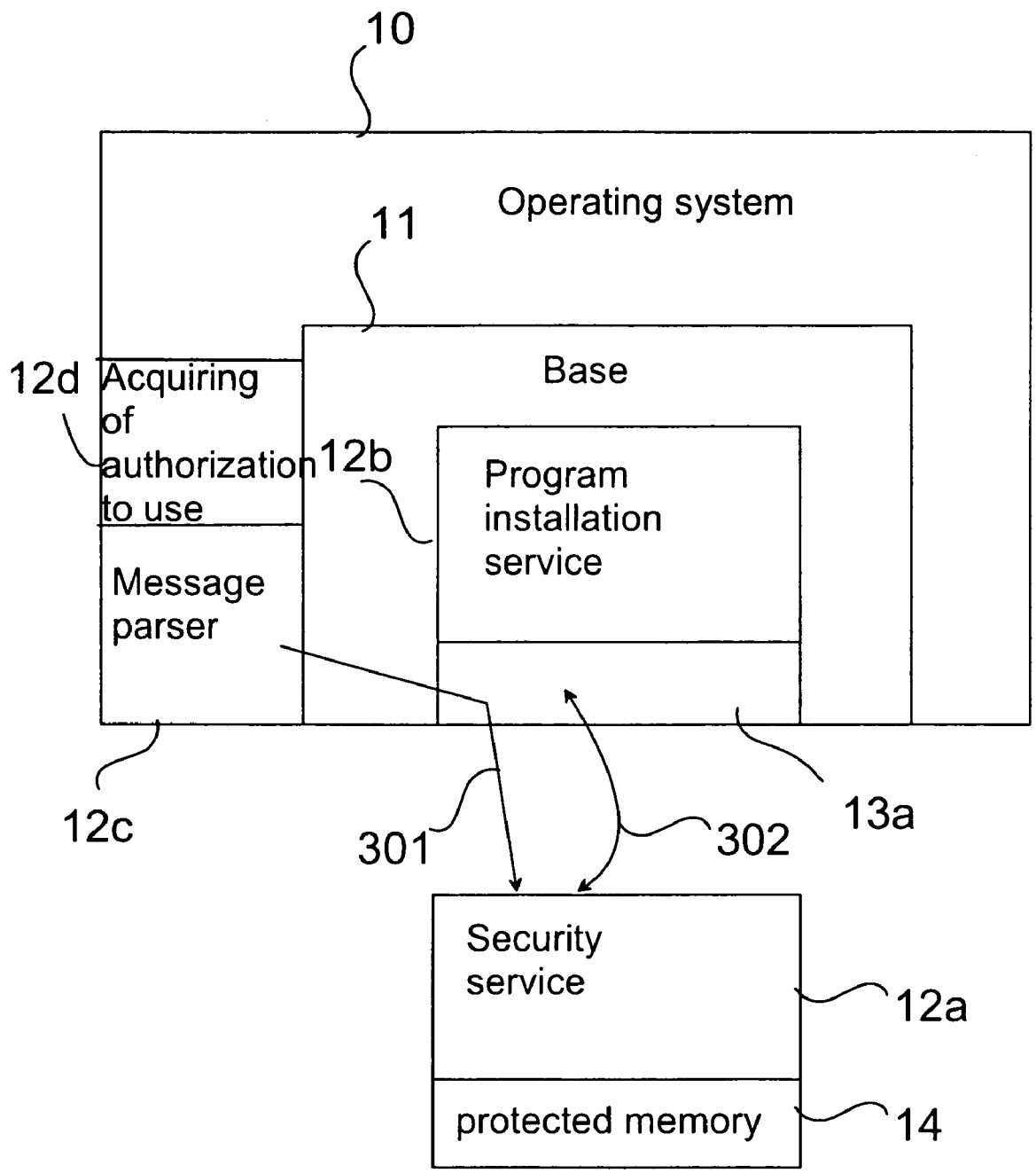
FIG. 3 shows the structure of the operating system in the device according to a preferred embodiment of the invention in a reduced manner.

FIG. 3 further illustrates the structure of the operating system 10 of the device 1 in a reduced manner. The operating system is for example Symbian OS™ operating system, but it is obvious that the invention can also be applied in connection with other such operating systems that contain security functions or other corresponding restrictions based on different authorizations to use. The operating system 10 according to this preferred example is based on a structure containing a base 11, services 12 and interfaces 13 for example for applications and the equipment. The base 11 is a so-called trusted base, wherein it is assumed that the base is functionally reliable and it is not necessary to monitor its operation by means of the security service 12a. The base 11 contains a program installation service 12b by means of which the programs to be executed are installed in the memory 5 of the device 1. The program installation service 12b contains a security interface 13a by means of which the program installation service 12b and the security service 12a can communicate with each other for example to check the trustworthiness of the programs to be installed and/or the authorization to use of the programs to be installed. The operating system 10 also contains a message processing service 12c in which for example the processing of messages received from the wireless communication network is performed in connection with the method according to the present invention, as will be described hereinbelow in this description. It is obvious that the operating system 10 can also comprise functions other than those presented above, but it is not necessary to discuss them in this context. Such functions include for example services relating to the control of the operating system.

At that stage when one wishes to begin the testing of the program, or wishes to acquire authorization to use for the program for testing at a later stage, the following steps are taken in the method according to an advantageous embodiment of the invention. The program to be tested is advantageously stored in the memory 5 of the device. The tester indicates advantageously by the user interface of the device 1 which program he or she wishes to start for testing. On the basis of this information the program installation service 12b checks whether authorization to use has been given for the program. Because there is no authorization to use in this case yet, the program installation service 12b informs the acquiring service 12d of the authorization to use of the need to perform acquisition of authorization to use. The acquisition service 12d for the authorization to use produces a message containing information on the device in which the testing is to be performed and on the program for which said authorization to use is to be given. The device information contains at least identification data of the device, such as a device ID, as well as information on the producer of the program to be tested. The message is transmitted by the transmitter 6 to the wireless communication network to be transmitted to the server 3 of the device manufacturer. In the server 3 of the device manufacture the device ID is examined from the received message, and on the basis of the same information on the device 1 and the producer of the program is retrieved from a database 3a in the server 3. This information contains for instance a public key complying with the device 1 or another corresponding key by means of which it is possible to perform the encryption of information in such a manner that decryption is possible only in the device 1. The data of the program producer contain information indicating what kind of authorization to use can be granted for the programs of said producer. These rights can depend on the agreement between the device manufacturer and the program producer.

If the information on the device 1 and on the program producer can be found in the database 3a of the server, it is possible to generate a grant message of authorization in the server. The server 3 advantageously signs this grant message of authorization digitally by using said device-specific public key, and transmits the digitally signed grant message of authorization to the communication network 2 to be transmitted to the device 1 via the wireless communication network 2a. The receiver 7 of the device receives the incoming digitally signed grant message of authorization in a manner known as such and transmits it to the message processing service 12c. The message processing service 12c examines the type of the message, wherein the grant message of authorization is transmitted via the security interface 13a to the security service 12a (arrow 301 in FIG. 3). The security service 12a performs at least an integrity check for the incoming message, i.e. verifies that the message is indeed transmitted from the server 3 of the device manufacturer. This integrity check (authenticity check) can be performed in a manner known as such, for example by checking the digital signature of the message. For this purpose, the public key of the device manufacturer or a corresponding device by means of which it is possible to check the digital signature is stored in the device 1, preferably in the protected memory 14.

In the method according to a preferred embodiment of the invention the grant message of authorization is encrypted before it is transmitted to the device 1. The encryption utilizes a public key determined for the device 1, the secret key corresponding to said public key being stored in the device 1, preferably in the protected memory 14. By means of encryption it is possible to ensure that the other devices are not capable of decrypting the encrypted message. Thus, the encryption can be utilized to indicate whether the message was intended for said device 1 (the device 1 is capable of performing the decryption) or not (the device 1 is not capable of performing the decryption). When the encryption of the message is used, the identification of the device 1 is not necessarily needed in the grant message of authorization, because only a predetermined device 1 can perform the decryption.

In connection with the integrity check of the message it is also possible to filter the flood of messages that have possibly arrived in the device to detect possible intrusion attempts. Filtering may also be necessary for the reason that the capacity of the security service 12a may be restricted, wherein it is reasonable to filter all clearly defective messages. The anti-flooding filtration can be performed for example on the basis of the current moment of time as well as on the basis of the number of messages received. If the number of messages is relatively small, and the time data is correct, it is possible to continue the processing of the authorization to use message. If the integrity of the message has been verified, the message is decrypted, if the message was encrypted. This can be performed either in the security service 12a, wherein the secret key of the device 1 is stored in the protected memory 14 of the security service. Thus, the message can be decrypted in a manner known as such by means of a secret key. After the possible decryption of the grant message of authorization, it is checked that the grant message of authorization is indeed intended for said device 1. This can be conducted on the basis of the device identification contained in the grant message, or if the grant message is encrypted, on the basis of that whether the decryption was successful. After the checking information contained in the grant message of authorization is transmitted to the program installation service 12b via the security interface 13a (arrow 302 in FIG. 3), if the grant message of authorization is intended for said device 1.

The grant message of authorization advantageously contains at least the following information. The parameters of authorization to use (authorization vector) that contain information on the functions that are allowed to be used by the program. These functions include for example functions relating to the handling of the SIM card, certain operating system functions, user interface functions, or the like. Furthermore, the grant message of authorization contains information on the identification of the program to which said message relates. Thus, the program installation service 12b can allocate the possible extensions/restrictions for the authorization to use to the correct program. Furthermore, a certain kind of temporal restriction relates to the granted authorization to use, which restriction can be indicated in several different ways or by a combination of them in the grant message of authorization. It is possible to determine a period of validity for the granted authorization to use, i.e. the length of time during which the authorization to use is valid. Another possibility is to indicate the expiration moment (time stamp), when the authorization to use expires. The number of reboot times may also be restricted as well as the installation times allowed for the program.

As a program identification or in addition to the same it is possible to use a one-way cryptographic hash code, i.e. a checksum. This checksum identifies unambiguously the program to which the grant message of authorization to use relates. The cryptographic hash code is produced on the basis of the content of the program (program code) in such a manner that preferably only a predetermined program code gives a certain cryptographic hash code. Thus, if only one bit changes in the program code, the result is a different cryptographic hash code. By means of this arrangement it is possible to grant rights by means of the grant message of authorization in accordance with the program version.

At this stage the program installation service 12b contains information on the authorization to use given for the program, and thus the program can be started and its function can be controlled within the scope of the determined authorization to use. From time to time the operating system 10 checks the validity of the authorization to use for example by comparing the passing time to the period of validity of the authorization to use granted for the program. At that stage when the authorization to use expires, information on the authorization to use, and if necessary, also the grant message of authorization is removed from the memory 5 of the device.

In such a situation where granted authorization to use already exists for the program in the device 1 (for example when the program to be tested is started again), the program installation service 12b examines the information on the granted authorization to use that is stored in the memory 5. When the identifier of a piece of information contains the same program identifier as the program to be started, it is possible to start the program and execute the program within the scope of the granted authorization to use in the period of validity of the authorization to use. If a limited number of rebootings relate to the validity of the authorization to use, information on the reboot times performed for the program and/or device is stored in the information on the authorization to use, wherein the program installation service 12b can compare the number of granted reboot times to the actual reboot times.

By means of temporally restricted authorization to use granted for testing in accordance with the invention, it is thus possible to perform the testing in conditions complying with an authentic operating situation. Another advantage of the temporal restriction is that there is a relatively small risk that an external intruder would be able to detect information important to security. A possible intrusion is for example that a third party records (encrypted) messages between the device and the communication network 2 and transmits them later to the device 1, thus attempting to evade the security mechanisms of the device 1 (replay attack).

By means of the method according to the invention it is possible to program-specifically control the authorization to use given to programs. Solutions of prior art do not have this possibility, but the weakening of the level of protection has affected all programs executed simultaneously.

In some cases it may be possible that the operating system executes a program by means of which attempts are made to determine the key used in the decryption by using so-called selected unencrypted information (brute force selected plain text attack). Such a program transmits a random character line to the security interface, and the program expects to obtain a message decrypted with a secret key as a reply thereto. When there are a sufficiently large number of such attempts, the program can detect the encryption key and gain access to such functions of the device 1 which should be available only for authorized programs. Such an attack can be detected for example in the security service 12a for example in such a manner that information decrypted with the secret key is examined. If this information does not comply with the grant message of authorization, it can be assumed that the message utilized initially in the decryption is not authentic. In such a situation the security service 12a does not return any information to the security interface 13a.

The security service 12a can be implemented for example as an inner function of the processor 4, by means of a smart card 15, such as a SIM card or in another location suitable for the purpose in connection with the device 1.

It is obvious that the present invention is not limited solely to the above-presented embodiments but it can be modified within the scope of the appended claims.

The invention claimed is:

1. A method for testing a program in a device, in which authorization to use is determined for the program, wherein a grant message of authorization is produced to grant temporally restricted authorization to use for the program, it is verified that the grant message of authorization is suitable for use only in said device, the verified grant message of authorization is transmitted to the device in which the verification is checked, the authorization to use transmitted in the grant message of authorization is determined, and authorization to use according to the grant message of authorization is given for the program to be tested, if the checking indicates that the grant message of authorization is intended for said device.

2. The method according to claim 1, further determining a device identification for the device and determining an identification for the producer of the program, wherein in the method the device identification and the identification of the program generator are checked before the grant message of authorization is produced.

3. The method according to claim 1, wherein conducting the verification is performed by signing the grant message of authorization digitally, wherein said digital signature is checked in the device to check the origin of the grant message of authorization.

4. The method according to claim 1, wherein conducting the verification is performed by encrypting the grant message of authorization, wherein said device performs the decryption, wherein the verification is checked by examining whether the decryption was successful.

5. The method according to claim 4, further determining a secret key and a public key corresponding to the secret key for the device, wherein the encryption of the grant message of authorization is performed by using said public key of the device, and the decryption is performed by using the secret key of the device.

6. The method according to claim 4, further checking the integrity of the grant message of authorization in the device before the decryption of the grant message of authorization.

7. The method according to claim 6, further determining a public key and a secret key corresponding thereto for the device manufacturer, wherein in the method the grant message of authorization is signed digitally before transmission by means of said secret key of the device manufacturer, and the integrity of the grant message of authorization is checked in the device by means of said digital signature by using said public key of the device manufacturer.

8. The method according to claim 6, further executing an operating system and a security service in the device, wherein the integrity of the encoded grant message of authorization is checked in said security service and information on the integrity of the grant message of authorization is transmitted to the operating system in which the encrypted grant message of authorization is decrypted, if the integrity check proved that the grant message of authorization has not been changed after the transmission.

9. The method according to claim 1, further executing an operating system and a security service in the device, wherein the verification of the grant message of authorization is checked in said security service and information on the content of the grant message of authorization is transmitted to the operating system in which the information is used for giving authorization to use when the program is executed.

10. The method according to claim 1, further transmitting the grant message of authorization to the device at least partly in a wireless manner.

11. A system for testing a program in a device, in which authorization to use is determined for the program, wherein the system contains a server for producing a grant message of authorization to grant temporally restricted authorization to use for the program, a verifier for verifying that the grant message of authorization is suitable for use only in said device, a communication network for transmitting the verified grant message of authorization to the device containing a checker for checking the verification of the grant message of authorization, determination means for determining the authorization to use transmitted in the grant message of authorization, and a program installation service for giving authorization to use according to the grant message of authorization for the program to be tested, if the checking indicates that the grant message of authorization is intended for said device.

12. The system according to claim 11, wherein the verifier comprises a generator of a digital signature for generating a digital signature in the utilization message of authorization to use.

13. The system according to claim 11, wherein the verifier comprises an encrypter for encrypting the utilization message of authorization to use.

14. The system according to claim 11, wherein the device contains at least one processor for executing an operating system and a security service, and a security interface for transmission of information between the security service and the operating system, wherein the verification of the verified grant message of authorization is arranged to be checked in said security service and information on the content of the grant message of authorization is arranged to be transmitted to the operating system via said security interface, and information on the content of the grant message of authorization is arranged to be utilized in the operating system when the program is executed.

15. The system according to claim 11, comprising a wireless communication network for transmitting the grant message of authorization to the device at least partly in a wireless manner.

16. A device containing at least one processor for testing a program, for which program authorization to use is granted, the device further comprising a receiver for receiving a verified grant message of authorization produced for the program to be tested to grant temporally restricted authorization to use for the program, a checker of the verification for checking the verification of the grant message of authorization, determination means for determining the authorization to use transmitted in the grant message of authorization, and a program installation service for giving authorization to use according to the grant message of authorization for the program to be tested, if the checking indicates that the grant message of authorization is intended for said device.

17. The device according to claim 16, containing at least one processor for executing an operating system and a security service, and a security interface for transmission of information between the security service and the operating system, wherein the verification of the verified grant message of authorization is arranged to be checked in said security service and information on the content of the grant message of authorization is arranged to be transmitted to the operating system via said security interface, and information on the content of the grant message of authorization is arranged to be utilized in the operating system when the program is executed.

18. A wireless communication device containing at least one processor for testing a program, for which program authorization to use is granted, the wireless communication device further comprising a receiver for receiving a verified grant message of authorization produced for the program to be tested to grant temporally restricted authorization to use for the program, a checker of the verification for checking the verification of the grant message of authorization, determination means for determining the authorization to use transmitted in the grant message of authorization, and a program installation service for giving authorization to use according to the grant message of authorization for the program to be tested, if the checking indicates that the grant message of authorization is intended for said wireless communication device.

19. The wireless communication device according to claim 18, to which the grant message of authorization is arranged to be transmitted at least partly in a wireless manner.

* * * * *